United States Patent [19]
Kemper

[11] Patent Number: 6,073,596
[45] Date of Patent: Jun. 13, 2000

[54] METHOD FOR CONTROLLING ELECTROMAGNETIC ACTUATORS FOR OPERATING CYLINDER VALVES IN PISTON-TYPE INTERNAL COMBUSTION ENGINES

[75] Inventor: Hans Kemper, Aachen, Germany

[73] Assignee: FEV Motorentechnik GmbH & Co. KG, Aachen, Germany

[21] Appl. No.: 09/126,725

[22] Filed: Jul. 31, 1998

[30] Foreign Application Priority Data

Jul. 31, 1997 [DE] Germany ............... 197 33 137

[51] Int. Cl.⁷ ..................................................... F01L 9/04

[52] U.S. Cl. ........................................................ 123/90.11

[58] Field of Search ......................... 123/90.11, 90.15

[56] References Cited

U.S. PATENT DOCUMENTS

| | | | |
|---|---|---|---|
| 4,945,870 | 8/1990 | Richeson | 123/90.11 |
| 5,190,013 | 3/1993 | Dozier | 123/481 |
| 5,671,705 | 9/1997 | Matsumoto et al. | 123/90.11 |
| 5,720,242 | 2/1998 | Izuo | 123/90.11 |

*Primary Examiner*—Wellun Lo
*Attorney, Agent, or Firm*—Venable; Norman N. Kunitz

[57] ABSTRACT

A method for controlling the current supply to an electromagnetic valve for operating a cylinder (gas exchange) valve (6 and 7) in a piston-type internal combustion engine, wherein the interior cylinder pressure is detected at least for determining the time "valve opens", and the detected pressure is supplied to the engine control device (14) as a measuring signal. Thereafter the respective actual time of switching off the retaining current at the retaining electromagnet (9, 10), on the one hand, and switching on the capturing current at the capturing electromagnet (9, 10) on the other hand, are corrected as a function of the detected interior cylinder pressure.

13 Claims, 1 Drawing Sheet

METHOD FOR CONTROLLING ELECTROMAGNETIC ACTUATORS FOR OPERATING CYLINDER VALVES IN PISTON-TYPE INTERNAL COMBUSTION ENGINES

REFERENCE TO RELATED APPLICATIONS

This application claims the priority of German Application Serial No. DE 197 33 137.8, filed Jul. 31, 1997 which is incorporated herein by reference.

FIELD OF THE INVENTION

The invention relates to a method for controlling the current supply to an electromagnetic actuator for operating a cylinder or gas exchange valve in a piston-type internal combustion engine.

BACKGROUND OF THE INVENTION

The employment of electromagnetic actuators for operating the cylinder or gas exchange valves in a piston-type internal combustion engine in place of a mechanical valve control offers the option of a fully variable valve control because of the electronic engine control device required for this. By means of this, it is possible for the first time to take the conditions to be preset, as well as the already set conditions, into account in a very differentiated manner in the course of triggering or controlling the valves.

An electromagnetic actuator for operating a gas exchange valve essentially consists of two electromagnets arranged at a distance from each other, between which an armature acting on the gas exchange valve is guided so it can be moved back and forth against the force of a restoring spring. The two electromagnets are alternatingly supplied with current corresponding to the triggering by the engine control device in such a way that, after the current has been cut off at the respective electromagnet retaining the armature, the latter is moved by the effects of the action of the force of the respective restoring spring in the direction toward the other electromagnet, which will capture it. To overcome the force of the restoring spring at the capturing electromagnet, the latter is supplied with current at an appropriately early time, so that the magnetic force being built up attracts the armature against the force of its restoring spring and brings it to rest against its pole face. Such an actuator represents a spring/mass oscillator constituted by the restoring springs on the one hand and the armature and the gas exchange valve on the other. The energy for initiating the movement of the mass, consisting of the armature and the gas exchange valve, out of the contact position is provided in the form of the spring energy present in the compressed restoring spring, which is released by turning off the current at the retaining electromagnet. The valve now swings almost as far as the opposite end position. The losses occurring during this movement are compensated by supplying current to the capturing magnet and the coupling-in of an electromagnetic capturing energy caused by this when approaching the end position of the capturing electromagnet.

In the course of operating a piston-type internal combustion engine, losses of movement energy occur at the individual spring/mass oscillator systems because of thermodynamic compatibility conditions. For example, the valves, in particular the gas exhaust valves, must be opened against the interior cylinder pressure. This leads to an increased requirement for capturing energy. The system-related stochastic fluctuations of the interior pressure in the combustion chamber lead to changing actual "opening" times of the respective gas exhaust valve, even with the exact control of the time for switching off the current at the retaining magnet of a gas exhaust valve. On the other hand, because of the differing losses during the valve movement in the course of the opening process, a different contacting behavior of the capturing magnet results if a constant capturing energy is coupled in through it.

The operationally caused different contacting behavior of the armature at the capturing magnet then leads to functional and acoustic problems. The stochastic behavior makes it particularly difficult to solve the acoustic problems by means of an optimized minimal capturing energy in connection with an optimal progression of coupling the energy into the magnet systems.

SUMMARY OF THE INVENTION

It is now the object of the invention to provide a method for controlling the current supply to the electromagnetic actuator for operating gas exchange valves in piston-type internal combustion engines by means of which the above problems are at least reduced.

This object is attained according to the invention by a method for controlling the current supply to the electromagnetic actuator for operating gas exchange valves in piston-type internal combustion engines, which has an opening magnet and a closing magnet, whose pole faces are oriented toward each other and between which an armature, which is connected with the gas exchange valve, is guided so it can move back and forth against the force of restoring springs, wherein, as a function of the combustion cycle and the changing load demands made on the piston-type internal combustion engine, alternatingly the current is switched on at the one magnet as the capturing and retaining current, and is switched off at the other magnet as the retaining current an engine control device, which is distinguished in that the interior cylinder pressure is detected at least for determining the time "valve opens" and is supplied to the engine control device as a measuring signal, and that respectively the actual time of switching off the retaining current on the one hand, and switching on the capturing current on the other hand, are corrected as a function of the detected interior cylinder pressure.

The way of functioning in accordance with the invention offers the advantage that the stochastic fluctuations of the interior combustion pressure in the course of operating the internal combustion engine, which also have a direct effect on the progression of movements at the gas exchange or cylinder valves of the respectively fired cylinders, are collected as the measuring and correction signal. The early detection of this stochastic behavior made possible by this is now used to positively affect the movement behavior of the gas exchange or cylinder valve. By detecting the interior cylinder pressure present at the "opening" time, and possibly also from the progression over time of the detected interior cylinder pressure, it is possible to draw conclusions regarding the movement energy losses to be expected, so that an appropriate correction can be performed via the engine control device both in regard to the size of the retaining current and in regard to the time of switching the retaining current off. For determining the correction value, the values predetermined for the respective load requirements are stored in the engine control device in the form of characteristics diagrams or the like, for example as a system of individual pressure values or pressure progressions. By means of this not only a set/actual comparison is possible, but it is also possible, for example, to "prealculate" the actual pressure progression from deviations in the pressure progression prior to the opening time provided by the engine control device, and therefore a correction can be initiated early on. In addition, it is also possible, in particular in connection with the gas exhaust valves, to perform an appropriate correction step regarding the expected correspondingly changing losses of movement energy of the armature being released both in respect to the time and to the size of the current to be switched on at the capturing electromagnet. Depending on the size of the detected interior cylinder pressure, it is possible to change the switch-off time in the direction of an earlier or a later time than the one predetermined by the engine control device, which is based on the remaining demands which are constituted by the load demands of the driver as well as other system-related demands. Accordingly, the time of switching on the current at the capturing magnet is pushed forward or back in time in comparison to the current switch-on predetermined by the engine control device. In addition it is possible to react to losses of the movement energy of the armature or the gas exchange valve caused as a result of losses of cylinder pressure by means of an appropriate increase or reduction of the current size at the capturing magnet, so that in connection with higher losses derived from this an increased capturing energy, and in connection with lower losses detected from this a correspondingly lesser capturing energy is coupled into tho system. This has the result that with an appropriate correction, the control of the current size predetermined by the engine control device on the basis of the mechanical data of the system in respect to a "more gentle" contacting of the pole face by the armature is aided in accordance with this goal.

By means of this, a possibility is provided to regulate the thermodynamic "opening" time of the gas exchange or cylinder valves, as well as to match the coupling-in of the capturing energy, both in respect to its time and to its size, to the requirements for a dependable and acoustically unobjectionable progression.

In a form of the method in accordance with the invention it is provided that the progression of the interior cylinder pressure is detected and that in case of a deviation from a value predetermined by the engine control device, a correction signal for controlling the current supply to the magnets is generated. The "value" can be predetermined in the form of a characteristic diagram with a multitude of individual values, which are associated with the different load demands, or also in the form of an appropriate system of curves or computer values. With this embodiment it is possible to match the triggering of the cylinder (gas exchange) valves even better and to better compensate the dead time effects of the control.

In a further form of the invention, the pressure in the induction tract and/or the exhaust tract of the piston-type internal combustion engine is detected and provided to the engine control device as a measuring signal and used for forming a correction signal, or is taken into consideration when forming the correction signal as a function of the internal cylinder pressure. Since the pressure in the induction tract and/or the exhaust tract primarily is not stochastic, but instead has a reproducible dynamic effect on the movement behavior of the cylinder valves, this pressure can also be used for achieving an improved valve movement behavior when controlling the gas exchange valves, for example in connection with the regulation of the retaining energy of the cylinder valves in their closed position.

It is correspondingly possible to take the detection of the pressure in the induction and/or the exhaust tract into account in the formation of the correction signal which is a function of the cylinder pressure. In a form of the method in accordance with the invention this can be achieved, for example, by forming the difference between the pressure detection signals of the induction tract and/or the exhaust tract and the interior cylinder pressure signal.

The invention will be explained in more detail by use of a block circuit diagram of a cylinder of a piston-type internal combustion engine.

BRIEF DESCRIPTION OF THE DRAWINGS

The single drawing FIGURE represents a block circuit diagram of a cylinder of a piston-type internal combustion engine.

DETAILED DESCRIPTION

Figure 1:
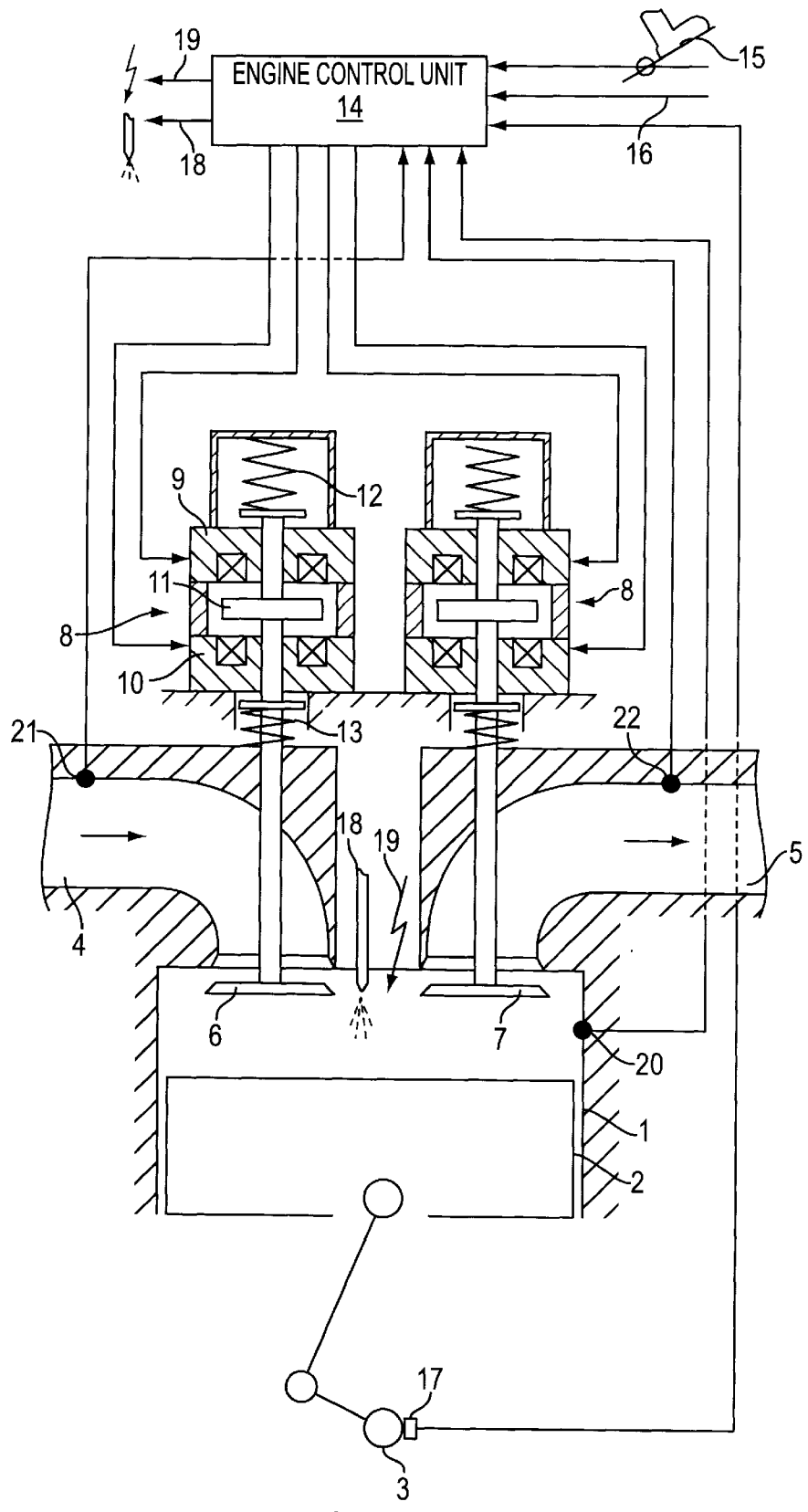

The FIGURE shows a cylinder 1 of a piston-type internal combustion engine, in which a piston 2 is moved up and down and acts on a crankshaft 3. This cylinder is provided with a gas inlet port 4 and a gas or exhaust port 5. The gas-conducting ports 3 and 4 are controlled by cylinder (gas exchange) valves 6, 7, respectively, in accordance with the demands of the combustion cycle, wherein the cylinder valve 6 constitutes the gas inlet valve and the cylinder valve 7 constitutes the gas exhaust valve.

The two cylinder valves 3 and 4 can each be controlled by a respective electromagnetic actuator 8 having two electromagnets arranged at a distance from each other, wherein the electromagnet at the top constitutes the closing electromagnet 9 and the magnet at the bottom constitutes the opening magnet 10.

An armature 11, which is guided so that it can move back and forth between the two electromagnets 9 and 10, acts on the respective cylinder valve 6 or 7 assigned to it. When the electromagnets 9 and 10 are not supplied with current, the armature 11 is maintained in the center position by restoring springs 12 and 13 as represented in the FIGURE. If the electromagnets 9 and 10 are alternatingly supplied with current in accordance with their triggering or control, the armature 11 is respectively moved against the restoring force of the associated restoring spring 12 or 13, for example, against the force of the restoring spring 12 in case of a movement in the direction toward the closing magnet 9, and, correspondingly, against the force of the restoring spring 13 in case of a movement in the direction toward the opening magnet 10.

The electromagnetic actuator 8 for the gas exhaust valve 7 is designed in the same way, so that it is possible to make reference to the above description regarding the design and function.

The two electromagnetic actuators 8 are triggered or controlled via an engine control device 14 which, in a known manner, is provided via a gas pedal 15 with the respective load setting desired by the driver as the corresponding regulating signal.

A multitude of further measuring and comparison signals, which are required for dependable engine operation, are provided to the engine control device 14 in the customary manner, for example, measured temperature values of the engine, etc., which are identified by the signal symbol 16. The type and number of the measuring signals to be taken into consideration by the engine control device 14 depends on the requirements and is not exhaustively enumerated in this application.

The detection of both the rpm and the crankshaft position by an appropriate sensor 17 are essential measuring signals, since the cylinder valves 6 and 7 are controlled in accordance with the combustion cycle as a function of the rpm and the crankshaft position, the same as for the fuel injection 18 and the ignition 19. In this case, the fuel injection 18 has been schematically represented as direct fuel injection.

The closing magnets 9 and the opening magnets 10 of the individual electromagnetic activators 8 for the respective cylinder valves 6 and 7 are connected with the engine control device 14, so that the electromagnets 9 and 10 are provided with current by an appropriately controlled current source, not shown in detail here, in accordance with the control by the engine control device 14 and according to the requirements of the combustion cycle and the load setting, as well as by taking into consideration further signals processed in the engine control device.

In accordance with the method to be executed here, the engine control device 14 is connected via a pressure sensor 20 with the interior cylinder chamber, as well as via a pressure sensor 21 with the gas inlet port 4, and via a pressure sensor 22 with the gas exhaust port 5 so that when the cylinder valves 6 and 7 are controlled, the interior cylinder pressure detected by the pressure sensor 20 and/or the pressure in the gas inlet port 4 detected by the pressure sensor 21 and/or the pressure in the gas exhaust port 5, detected by the pressure sensor 22, can be taken into consideration when controlling the electromagnetic actuators 8 of the cylinder valves 6 and 7.

The interior cylinder pressure detected by the pressure sensor 20 can now be detected within the scope of a narrow time window, or also as a pressure progression, wherein it is necessary here to perform a comparison with a "normal progression" stored in the engine control device 14 for the various load conditions, from which an appropriate correction signal is then generated for triggering the respective gas exchange valve.

If, for example, both cylinder valves 6 and 7 are closed for the induction cycle, the gas inlet valve 6 is opened when the piston 2 moves downward. In this case the opening time can be variably set via the engine control device 14 wherein, for example, for increasing the degree of filling, the opening time can be set in such a way that the cylinder valve is only opened at a time when the piston 2 has already performed a larger downward movement and a corresponding vacuum has been created in the inner cylinder chamber. If the gas inlet valve 6 is now opened, the movement of the gas inlet valve in the direction toward the opening magnet 10 is aided because of the (over) pressure in the gas inlet port 4 and the (under) pressure in the interior cylinder chamber, so that, in addition to the force of the restoring spring 12, the mass, which essentially consists of the armature 11 and the gas inlet valve 6, is accelerated in the direction toward the opening magnet 10.

With control of the current supply of the then capturing opening magnet 10 only taking place via the sensor 17, this additional force effect on the opening gas exchange system would not be taken into consideration, so that the switching-in of the capturing current at the opening magnet 10 would be "too late" for all practical purposes, and accordingly the armature 11 can no longer be dependably captured by the opening magnet 10. Now, if the pressure conditions in the interior cylinder chamber and in the gas inlet port 4 are taken into consideration both in respect to the triggering or controlling of the opening time, i.e. switching off the retaining current at the closing magnet 9, as well as in respect to the switching-on time of the capturing current at the opening magnet 10, it is possible, for one, to switch on the capturing current at the opening magnet 10 earlier and, taking into consideration the additional acceleration by the gas force, the current can be supplied in a reduced amount without endangering the dependable capture of the armature 11 at the pole face of the opening magnet 10.

The same is correspondingly true for closing the cylinder valves 6 and 7, because then the overpressure being built up in the interior cylinder chamber on the one hand, and the vacuum being created in the gas inlet port 4 because of the gas-dynamic operations on the other hand, aid the closing process of the gas exhaust valve 7. However, in accordance with the reversal of the pressure conditions, the gas exhaust valve 7 must be opened during the exhaust phase against the diminishing pressure in the interior cylinder chamber. In accordance with this, it is possible to correctingly affect the triggering or controlling of the electromagnetic actuator 8 for the gas exhaust valve 7 by detecting the pressure conditions in the interior cylinder chamber and in the gas exhaust port 5.

It can be seen from the above extensive explanation of the movement progression of the gas exhaust valve 6, that the control signal can be correspondingly corrected in the engine control device 14 at an earlier time, prior to the switching-on time of the capturing opening magnet 10, via the pressure conditions in the interior cylinder chamber and complemented, if required, via the pressure conditions in the gas inlet port 4, so that here, too, unavoidable dead times can be compensated by the method in accordance with the invention.

It furthermore can be seen from the above description of the pressure conditions that, even with the cylinder valves 6 and 7 closed, different pressures act on the cylinder valves as a function of the position of the piston and a function of the combustion cycle. With a predominance of the interior cylinder pressure in the compression and combustion phase, the cylinder valves 6 and 7 are therefore pressed on their valve seats by large forces, so that theoretically the retaining current at the respective closing magnet could be set to zero.

With conventional engine control devices, the current supply to the respectively retaining electromagnet is designed at a lower level in comparison with the current supply to a respectively capturing electromagnet in order to save electric energy here. In addition, the retaining current is also "cycled", i.e., the retaining current is briefly switched off until it has been lowered to a preselected lower level, and is then switched on again, until it has reached a preselected upper level, and is then switched off again, so that additional electrical energy is saved in this way. Taking the pressure forces acting on the gas exchange valves into consideration, it is now possible here by means of the engine control device 14 to appropriately correct the level margin for the cycling. With overpressure in the cylinder the level of cycling can be reduced, and with an underpressure in the cylinder the level of cycling can be raised.

In the explanation of the method, in the schematic drawings the pressure sensors 21 and 22 are respectively arranged in the discrete gas inlet port 4, or the gas exhaust port 5 of a cylinder. However, to reduce the measuring outlay, it is basically also possible to arrange the pressure sensors 21 and 22 in the gas inlet tract, or respectively the gas exhaust tract of the engine, in which the respective gas exhaust ports, or respectively gas exhaust ports of all cylinders are combined. If the pressure conditions directly in the inlet, or respectively exhaust area of a cylinder are intended to be taken into consideration, the respective pressure sensors of engines, which have two or more gas inlet valves and possibly two or more gas outlet valves each, would be arranged in an area upstream of the branching of the gas inlet, or respectively outlet.

The invention now being fully described, it will be apparent to one of ordinary skill in the art that many changes and modifications can be made thereto without departing from the spirit or scope of the invention as set forth herein.

What is claimed is:

1. A method for controlling the current supply for an electromagnetic actuator for operating a cylinder valve of a cylinder in a piston-type internal combustion engine, which actuator has an opening magnet and a closing magnet having respective pole faces which are oriented toward each other and between which an armature, which is connected with the cylinder valve, is guided so it can move back and forth against the force of restoring springs, said method comprising; using an engine control device and as a function of the combustion cycle and the changing load demands made on the piston-type internal combustion engine, alternatingly switching the current on at one of the magnets as a capturing and retaining current, and switching off the current at the other magnet as a retaining current; detecting the pressure in the interior of the cylinder associated with the respective cylinder valve to at least determine the time the valve opens; supplying the detected pressure to the engine control device as a measuring signal; and correcting the respective actual times of switching off the retaining current at the magnet supplied with the retaining current, and of switching on the capturing current at the magnet to be supplied with capturing current as a function of the detected interior cylinder pressure.

2. The method in accordance with claim 1, wherein the step of detecting further includes detecting the progression of the interior cylinder pressure; and further comprising generating a correction signal for the control of the current supply to the magnets in case of a deviation from a value predetermined by the engine control device.

3. The method in accordance with claim 2, further comprising detecting the pressure in at least one of an induction tract and an exhaust tract of the piston-type internal combustion engine and supplying the further detected pressure as a measuring signal to the engine control device; and taking the further detected pressure into consideration in the formation of the cylinder-pressure-dependent correction signal during the step of correcting.

4. The method in accordance with claim 3, wherein the detected pressure in at least one of the induction tract and in the exhaust tract is taken into consideration by forming the difference with respect to the detected interior cylinder pressure.

5. The method in accordance with claim 4, wherein the detected pressure in at least one of the induction tract and in the exhaust tract is taken into consideration when regulating the retaining current at the closing magnet.

6. The method in accordance with claim 1, further comprising detecting the pressure in at least one of an induction tract and an exhaust tract of the piston-type internal combustion engine and supplying the further detected pressure as a measuring signal to the engine control device; and taking the further detected pressure into consideration in the formation of the cylinder-pressure-dependent correction signal during the step of correcting.

7. The method in accordance with claim 6, wherein the detected pressure in at least one of the induction tract and in the exhaust tract is taken into consideration by forming the difference with respect to the detected interior cylinder pressure.

8. The method in accordance with claim 7, wherein the detected pressure in at least one of the induction tract and in the exhaust tract is taken into consideration when regulating the retaining current at the closing magnet.

9. The method in accordance with claim 1, wherein the detected pressure in at least one of the induction tract and in the exhaust tract is taken into consideration by forming the difference with respect to the detected interior cylinder pressure.

10. The method in accordance with claim 1, wherein the detected pressure in at least one of the induction tract and in the exhaust tract is taken into consideration when regulating the retaining current at the closing magnet.

11. The method in accordance with claim 1 further comprises additionally using the measuring signal to vary the value of at least one of the retaining current and the capturing current as a function of the detected interior cylinder pressure.

12. The method in accordance with claim 1 wherein the detected cylinder pressure is used to control the actual times of switching of a cylinder exhaust valve.

13. The method in accordance with claim 12 wherein the detected cylinder pressure additionally is used to control the actual times of switching of a cylinder inlet valve.

* * * * *